US011558402B2

(12) United States Patent
Sundararajan et al.

(10) Patent No.: US 11,558,402 B2
(45) Date of Patent: Jan. 17, 2023

(54) VIRTUAL SWITCH-BASED THREAT DEFENSE FOR NETWORKS WITH MULTIPLE VIRTUAL NETWORK FUNCTIONS

(71) Applicant: Cisco Technology, Inc., San Jose, CA (US)

(72) Inventors: Balaji Sundararajan, Fremont, CA (US); Alberto Rodriguez Natal, Mountain View, CA (US); Yegappan Lakshmanan, Union City, CA (US); Fabio R. Maino, Palo Alto, CA (US); Anand Oswal, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 463 days.

(21) Appl. No.: 16/666,143

(22) Filed: Oct. 28, 2019

(65) Prior Publication Data
US 2021/0126927 A1 Apr. 29, 2021

(51) Int. Cl.
*H04L 9/40* (2022.01)
*G06F 21/56* (2013.01)
*G06F 21/53* (2013.01)
*G06F 21/55* (2013.01)

(52) U.S. Cl.
CPC .......... *H04L 63/1416* (2013.01); *G06F 21/53* (2013.01); *G06F 21/552* (2013.01); *G06F 21/566* (2013.01); *H04L 63/1425* (2013.01); *H04L 63/1433* (2013.01); *H04L 63/1441* (2013.01); *H04L 63/20* (2013.01)

(58) Field of Classification Search
None
See application file for complete search history.

(56) References Cited

U.S. PATENT DOCUMENTS

| 8,898,788 B1 * | 11/2014 | Aziz .................. H04L 63/1491 726/23 |
| 9,027,135 B1 * | 5/2015 | Aziz .................. H04L 63/1491 726/23 |
| 9,166,988 B1 * | 10/2015 | Shin .................... H04L 63/1416 |
| 9,489,516 B1 | 11/2016 | Lu et al. |
| 9,661,009 B1 | 5/2017 | Karandikar et al. |
| 9,792,430 B2 | 10/2017 | Golshan et al. |
| 10,033,759 B1 | 7/2018 | Kabra et al. |

(Continued)

OTHER PUBLICATIONS

Oyama et al. "Detecting malware signatures in a thin hypervisor," SAC '12 Proceedings of the 27th Annual ACM Symposium on Applied Computing pp. 1807-1814.

(Continued)

*Primary Examiner* — Joseph P Hirl
*Assistant Examiner* — Hassan Saadoun
(74) *Attorney, Agent, or Firm* — Patterson + Sheridan, LLP

(57) ABSTRACT

Techniques for providing network traffic security in a virtualized environment are described. A threat aware controller uses a threat feed provided by a threat intelligence service to establish a threat detection engine on virtual switches. The threat aware controller and threat detection engine work together to detect any anomalous or malicious behavior of network traffic on the virtual switch and established virtual network functions to quickly detect, verify, and isolate network threats.

19 Claims, 6 Drawing Sheets

(56) References Cited

U.S. PATENT DOCUMENTS

2013/0219500 A1* 8/2013 Lukas .................... G06F 21/50
                                                    726/23
2016/0191545 A1* 6/2016 Nanda .................... H04L 43/20
                                                    726/1
2017/0099313 A1* 4/2017 Singuru ............. G06F 9/45558
2017/0250892 A1* 8/2017 Cooper ................ G06F 21/552
2018/0008410 A1  1/2018 Ruyra-Baliarda et al.

OTHER PUBLICATIONS

Peter Friedrich Klemperer, "Efficient Hypervisor Based Malware Detection," Carnegie Mellon University, May 2015, 141 pages.

Chaignon et al. "Oko: Extending Open vSwitch with Stateful Filters," SOSR '18, Mar. 28-29, 2018, Los Angeles, CA, USA, 13 pages.

Khalid Elbashir, "Trusted Execution Environments for Open vSwitch A security enabler for the 5G mobile network," KTH Royal Institute of Technology, Nov. 17, 2017, 81 pages.

\* cited by examiner

VIRTUAL SWITCH-BASED THREAT DEFENSE FOR NETWORKS WITH MULTIPLE VIRTUAL NETWORK FUNCTIONS

TECHNICAL FIELD

Embodiments presented in this disclosure generally relate to threat defense by network traffic analysis mechanisms in network components including virtual network switches. More specifically, embodiments disclosed herein relate to methods and systems for providing a threat aware controller and threat detection engine in virtual switches.

BACKGROUND

Networked systems face constant threats from malicious actors that attempt to reallocate network processing and communication resources for other purposes. As networks shift services and functions to virtualized environments, it is a now common practice for virtual networks to leverage virtual network functions (VNFs) from a multitude of vendors on a single virtual switch. Quickly and efficiently responding to threats that may come from these multitude of VNFs remains a challenge for network operators.

BRIEF DESCRIPTION OF THE DRAWINGS

So that the manner in which the recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Figure 1:
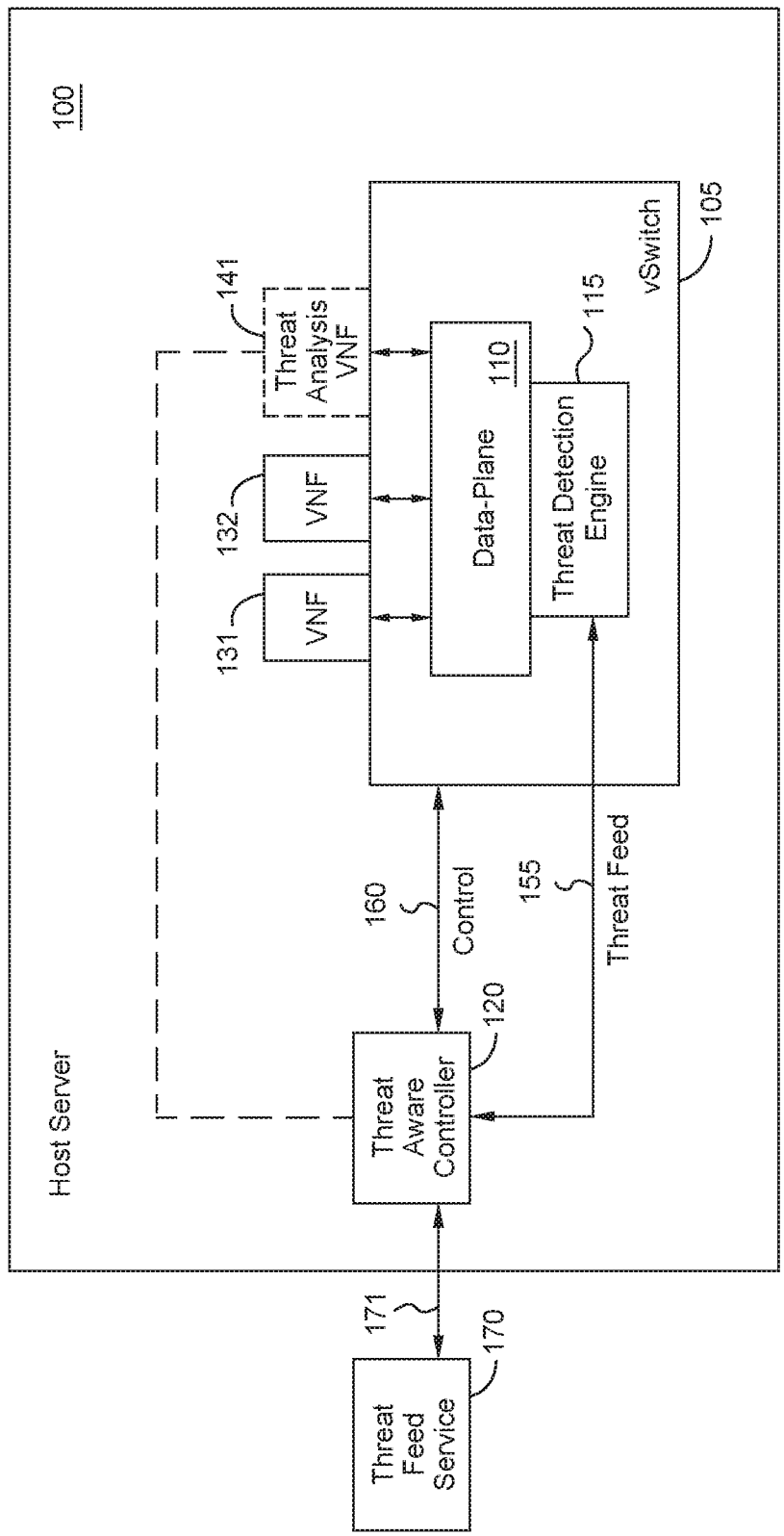
FIG. 1 illustrates a host server, according to one embodiment.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method for network threat detection at a threat aware controller. The method includes: initiating a threat detection engine in a virtual network switch (vSwitch); providing a threat feed to the threat detection engine; receiving a request to initiate a threat analysis Virtual Network Function (VNF) from the threat detection engine, where the request to initiate a threat analysis VNF is transmitted from the threat detection engine upon detection of a threat anomaly; initiating a threat analysis VNF; updating the threat detection engine with a threat analysis VNF configuration; redirecting network traffic at the vSwitch to the threat analysis VNF; and receiving a threat analysis report from the threat detection engine and/or threat analysis VNF. Other embodiments of this aspect include corresponding computer systems, apparatus, and computer programs recorded on one or more computer storage devices, each configured to perform the actions of the methods.

One embodiment is a system that includes: a processor; and a memory including instructions which, when executed on the processor, performs an operation. The operation includes: initiating a threat detection engine in a virtual network switch (vSwitch); providing a threat feed to the threat detection engine; receiving a request to initiate a threat analysis virtual network function (VNF) from the threat detection engine, where the request to initiate a threat analysis VNF is transmitted from the threat detection engine upon detection of a threat anomaly; initiating a threat analysis VNF; updating the threat detection engine with a threat analysis VNF configuration; redirecting network traffic at the vSwitch to the threat analysis VNF; and receiving a threat analysis report from the threat detection engine and/or threat analysis VNF. Other embodiments of this aspect include corresponding computer systems, apparatus, and computer programs recorded on one or more computer storage devices, each configured to perform the actions of the operation.

One embodiment is a method that includes: receiving, at a threat detection engine on a virtual network switch (vSwitch) a threat feed including a plurality of network threat properties from a threat aware controller; inspecting network traffic associated with one or more virtual network functions (VNFs) on the vSwitch; detecting a threat anomaly in the inspected network traffic using the threat properties; transmitting a request to initiate a threat analysis VNF to the threat aware controller; receiving a threat VNF configuration from the threat aware controller upon initiation of the threat analysis VNF; isolating network traffic associated with the threat anomaly to the threat analysis VNF; monitoring traffic at the threat analysis VNF; and generating a threat analysis report based on the monitored traffic; and transmitting the threat analysis report to the threat aware controller. Other embodiments of this aspect include corresponding computer systems, apparatus, and computer programs recorded on one or more computer storage devices, each configured to perform the actions of the methods.

EXAMPLE EMBODIMENTS

To provide increased speed and resource efficiency, network providers are moving many functions and processes into virtualized environments including virtual network functions (VNFs). These VNFs includes distributed applications and processes running and executing on the network. In many cases, network providers initiate and run VNFs from several different third parties connected to the same single virtual switch in a network infrastructure. For example, an application from a first customer of the network provider may execute on the same computing and networking resources as an application from a second customer. This collocation of the applications allows for efficient use of computing and network resources by the network provider, but also presents security and access concerns to the third party customers. For example, third party customers do not want their applications compromised by another application executing on the same network resource. The visibility and access into the VNFs from the network and the network resources are limited due to the lack of access to the source code and/or operating state of the third party VNFs.

Without visibility or control of the VNFs, network providers' face challenges in ensuring that the hosting infrastructure is not vulnerable to third party VNFs that are misbehaving (e.g., misusing network resources, transmitting malicious traffic, etc.) or have been compromised (e.g., taken over by a malicious actor). In some embodiments, virtualization infrastructures detect threats with external monitoring systems (e.g., a network system monitors how virtualized functions interact with external systems). These techniques often fail to quickly adapt to and address newly created and evolving threats. Thus, threats may spread quickly through a network before network systems are able to detect the presence of the threat.

The system and methods described herein provide updated and evolving threat protection in virtualized network environments by using a centralized threat aware controller in combination with an external threat information feed. The threat aware controller embeds a threat detection engine within virtual components of the network providing internal monitoring within the infrastructure of the network and close to various VNFs running on the computing and network resources. The threat aware controller continually updates the threat detection engine with potential threats from the external threat information feed. The embedded threat detection engine in the various virtual components monitors network traffic at the virtual components using the information provided from the threat aware controller and coordinates with the threat aware controller to detect malicious traffic and initiate threat analysis VNFs for suspected traffic. The threat detection engine also updates the threat aware controller with newly detected threats to update the external threat information feed.

FIG. 1 illustrates a host server, according to one embodiment. As shown, the host server 100 includes a virtual switch (vSwitch) 105 on the host server 100. In some examples, the host server 100 and the vSwitch 105 are components of an application centered software defined virtual network infrastructure. The host server 100 also may include multiple vSwitches in addition to vSwitch 105 as described in relation to FIG. 2. The vSwitch 105 acts as a programmable and extensible virtual switching function for various virtual machines and functions executing on and/or in communication with the host server 100. For example, the virtual network functions (VNFs) 131 and 132 are virtual machines, applications, etc. executing on the host server 100 and transmitting and receiving network traffic via the vSwitch 105. In some examples, the network traffic generated by the VNFs 131-132 and other network elements interacting with the vSwitch 105 is transmitted via a data-plane 110 on the vSwitch 105. The vSwitch 105 in addition to the VNFs 131-132 also hosts a threat detection engine 115 as described herein.

Figure 2:
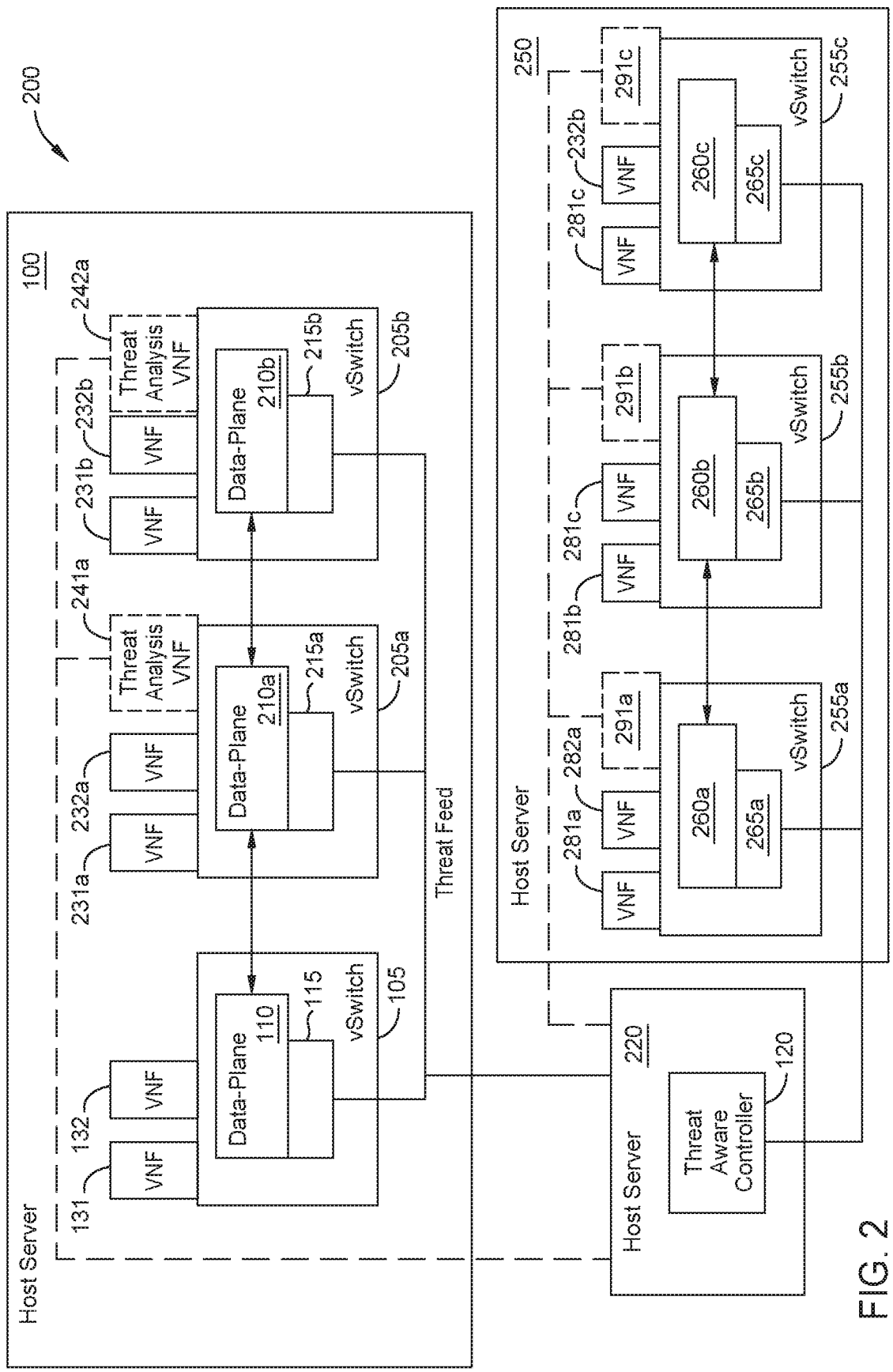
FIG. 2 illustrates a server infrastructure with multiple virtual switches, according to one embodiment.

The vSwitch 105 is managed by centralized Threat-Aware controller (TA controller 120) which provides control instructions to the vSwitch 105 via the control messages 160. While described herein in relation to the threat control and threat mitigation management of the vSwitch 105, the TA controller 120 may also function as a general network controller located remotely from the host server 100, and initiating and configuring the various virtual components (e.g., the vSwitch 105, VNFs 131-132, etc.) on the host server 100 and other host servers and network components (as shown in FIG. 2).

The control messages 160 configure the vSwitch 105 and the various components of the vSwitch 105 including the data-plane 110 and a threat detection engine 115. The threat detection engine 115 is a security agent that operates as an extension, application, and/or program configured and initiated by the TA controller 120 running on the vSwitch 105. In some examples, the TA controller 120 initiates the threat detection engine 115 during initialization of the vSwitch 105 or during initialization of the VNFs 131-132.

The TA controller 120 receives an external threat feed 171 from one or more external sources such as a threat feed service 170. The threat feed service 170 may be a third party commercial threat detection service. The threat feed service 170 may also be provided by the provider of host server 100 and include information detected at various networks provided by the network provider. The external threat feed 171 includes up-to-date threat properties for globally detected or known threats. For example, threats detected at other host servers in a network and/or provided by the threat feed service 170 are provided to the TA controller 120 in the external threat feed 171.

The TA controller provides the external threat feed 171 via a threat feed 155 to the threat detection engine 115 running on the vSwitch 105. In some examples, the threat feed 155 is provided to the threat detection engine 115 once the threat detection engine 115 parses/processes the external threat feed 171 and the threat properties into the threat feed 155 for the threat detection engine 115. This allows the threat detection engine 115 to execute with lower processing overhead in the vSwitch 105. For example, the TA controller 120 processes the global threat feed provided in the external threat feed 171 to generate the threat feed 155 which includes specific packet signatures and other network traffic properties of threats that the threat detection engine 115 uses to examine and inspect traffic at the vSwitch 105.

In some examples, the threat detection engine 115 provides telemetry and reporting data to the TA controller 120, such that the TA controller 120 receives accurate information and metrics of the live traffic in the virtualized environment of the vSwitch 105 (e.g., traffic in the data-plane 110) as well as insight on any anomalies that may occur in association with the virtual applications (VNFs 131-132). The TA controller 120 uses the telemetry and other reporting data to update both the threat feed service 170 and other switches executing on the host server as described in FIG. 2. For example, the TA controller 120 detects an emerging network threat, such as malicious network traffic, and informs the threat feed service 170 and the various other vSwitches in the network of the threat.

The threat detection engine 115 uses the received threat feed 155 including the network threat properties to inspect network and/or application traffic to and from the VNFs 131-132 initiated on the vSwitch 105. In some examples, the threat detection engine 115 performs line rate signature matching using the network threat properties on the traffic going in/out/through the virtualized applications (VNFs 131-132) running on top of the vSwitch 105 among other traffic inspection techniques. In some examples, when a signature associated with a known threat is observed or detected, the threat detection engine 115 drops the network traffic associated with the detected signature and generates a security alert and sends the security alert to the TA controller 120 indicating a threat is detected. In some examples, the threat detection engine 115 also generates a request to initiate a threat analysis VNF for the vSwitch 105. The request to initiate a threat analysis VNF may be sent as part of the security alert or as a separate request to the TA controller 120.

The TA controller 120, in response to receiving a request to initiate a threat analysis VNF from the threat detection engine, initiates a threat analysis VNF 141. The threat analysis VNF 141 functions as VNF, but is also in communication with the threat detection engine 115 and the TA controller 120. The behavior and configuration of the threat analysis VNF 141 is known and set by the TA controller 120. When network traffic is isolated to the threat analysis VNF 141, the TA controller 120 and the threat detection engine 115 detect any abnormal or malicious behavior when the threat analysis VNF 141 and the network traffic associated with the threat analysis performs actions outside of the known configuration. In some examples, the TA controller 120 configures the vSwitch 105 to send samples of traffic to the TA controller 120. The TA controller 120 inspects the samples of network traffic and detects threats and potential threats and updates the threat feed 155 and the threat feed service 170.

In general, the TA controller 120 and the hosting server can reserve processing and resource capacity such that a threat analysis VNF may be initiated for each requesting vSwitch when requested by a threat detection engine. In another example, when the host that the vSwitch is serving cannot allocate the VNF at a specific vSwitch, (e.g., due to resource utilization, etc.), the TA controller 120 initiates a threat analysis VNF in an alternate vSwitch as described in FIG. 2.

FIG. 2 illustrates a server infrastructure 200 with multiple virtual switches, according to one embodiment The server infrastructure 200 includes the host server 100 as well as the host servers 220 and 250. In some examples, the TA controller is remote from the various host servers hosting vSwitches. For example, the TA controller is located on the host server 220 and provides control messages and the threat feed 155 to the various host servers and vSwitches in the infrastructure 200. In some examples, the host servers 100 and 200 include multiple vSwitches. For example, the host server 100 includes the vSwitch 105 as well as the vSwitches 205*a*-*b* and the associated VNFs 231*a*-*b* and 232*a*-*b*. The host server 250 includes the vSwitches 255*a*-*c* and the associated VNFs 281*a*-*c* and 282*a*-*c*. When the threat detection engine 115 requests a threat analysis VNF, but the threat analysis VNF 141 cannot be initiated on the vSwitch 105, (e.g., due to resource constraints, etc.), the TA controller 120 determines from the available vSwitches in the infrastructure 200, such as the vSwitches 215*a*-*b* or vSwitches 255*a*-*c*, an alternate location for the requested threat analysis VNF.

In some examples, the alternate location is an available vSwitch (e.g., vSwitch with resources to host a VNF) or other hosting component which is closest to the requesting threat detection engine (e.g., the threat detection engine 115). In FIG. 2, the TA controller 120 initiates the threat analysis VNF 241*a* as the alternate location. Other alternate potential locations for the threat analysis VNF includes any of the alternate locations 242*a* and 291*a*-*c*. The TA controller 120 or the threat detection engine 115 forwards or isolates the identified suspicious traffic to the threat analysis VNF 241*a*. In an example, where the vSwitch 205*a* is not available due to resource constraints or other networking issues, the vSwitch 205*b* or the vSwitches 255*a*-*c* may be used as the alternate location for a threat analysis VNF.

Figure 3:
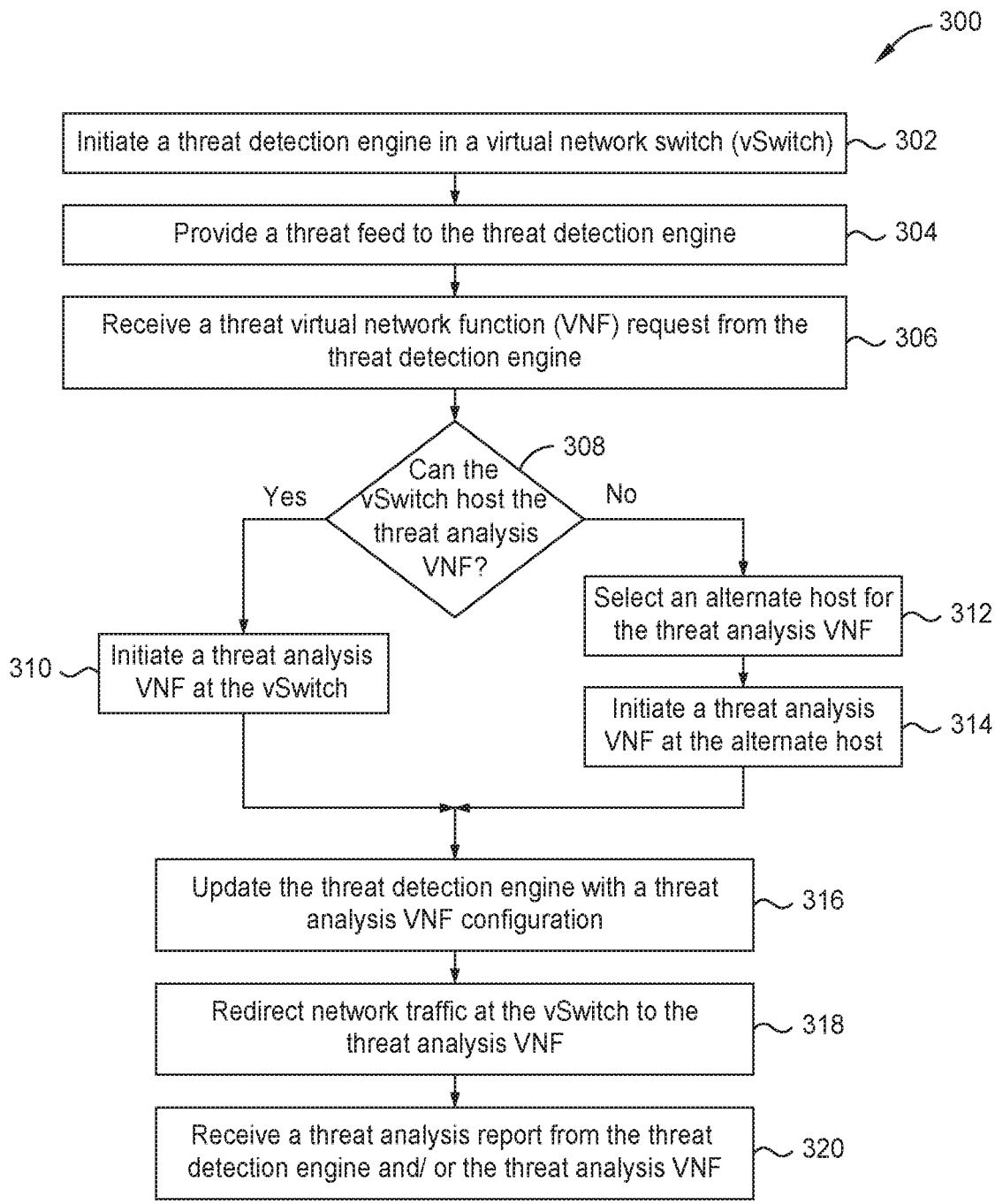
FIGS. 3-4 illustrate methods for network threat detection at a threat aware controller, according to one embodiment.

FIG. 3 illustrates a method for network threat detection at a threat aware controller, according to one embodiment. Method 300 begins at block 302 where the TA controller 120 initiates a threat detection engine in a vSwitch. For example, as shown in FIG. 1, the TA controller 120 initiates the threat detection engine 115 in the vSwitch 105. In some examples, the threat detection engine 115 is configured and initiated at a time the vSwitch 105 is initialized. The threat detection engine 115 may also be initiated when VNFs are installed, executing on, and/or utilizing the vSwitch 105. For example, as the VNF 131 and the VNF 132 begin executing on the vSwitch 105, the TA controller 120 initiates the threat detection engine 115. The TA controller 120 initiates the threat detection engine 115 on the vSwitch 105 as a security agent closely associated with and interacting with the dataplane 110 in order to monitor, inspect, and isolate network traffic as needed when a threat is detected.

At block 304, the TA controller 120 provides a threat feed to the threat detection engine 115. In some examples, the TA controller 120 receives an external threat feed 171 and processes and extracts information relevant to the vSwitch 105 and the threat detection engine 115. For example, the TA controller 120 processes the external threat feed 171 to determine various packet signatures and other threat identification information relevant to the vSwitch 105 and the threat detection engine 115. In some examples, the relevant threats may include all globally identified threats received in the external threat feed 171. In some examples, the TA controller 120 provides a subset of the globally identified threats that relate to the various functions and services executing on the network (e.g., the VNFs 131 and 132).

Figure 5:
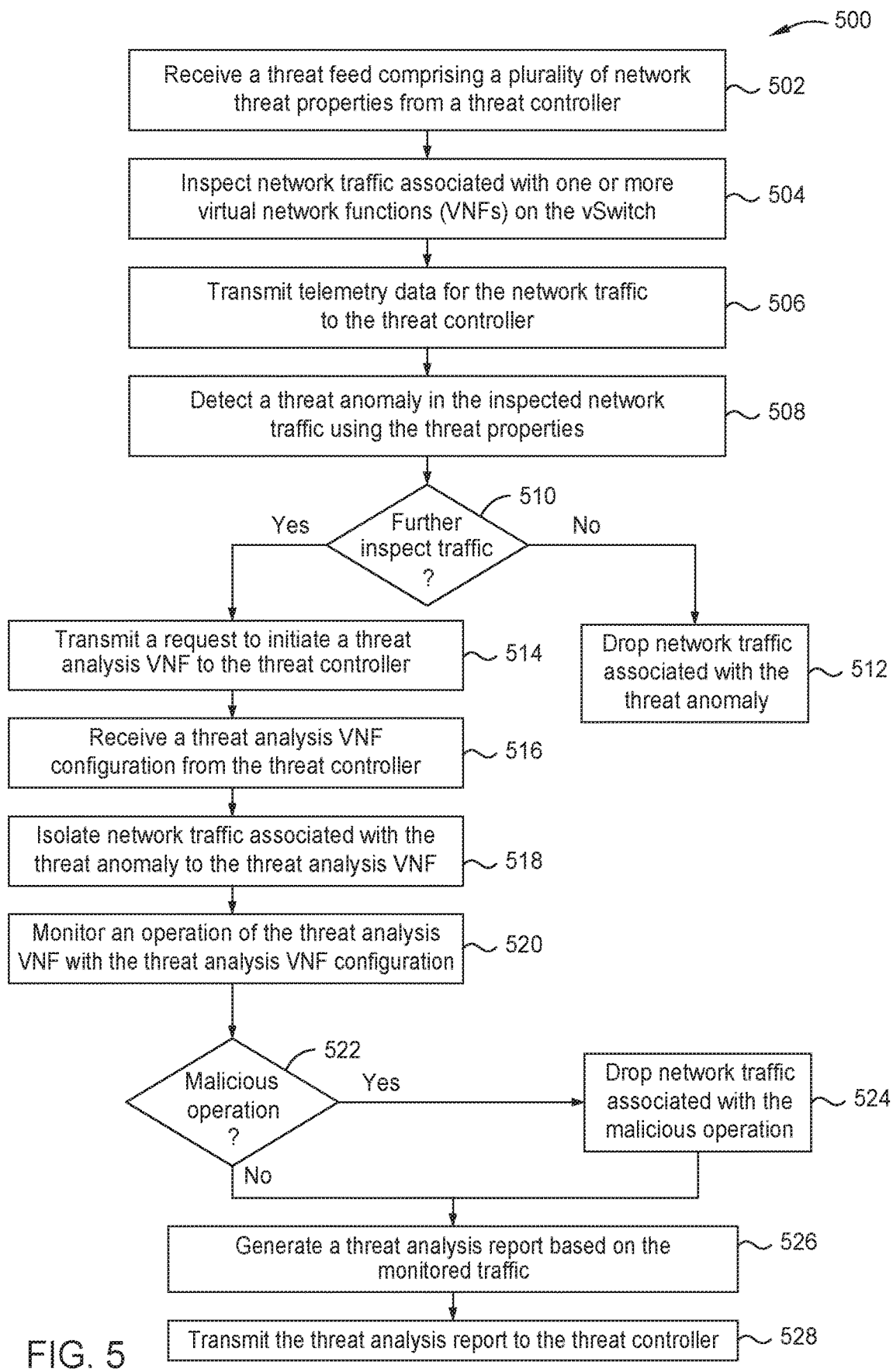
FIG. 5 a method for network threat detection at a threat detection engine on virtual network switch, according to one embodiment.

The threat detection engine 115 uses the threat feed 155 to inspect network traffic associated with the VNFs 131-132 on the vSwitch 105, and detect a threat anomaly in the inspected network traffic using the threat properties, and transmit a request to initiate a threat analysis VNF to the TA controller 120 as described in relation to FIG. 5.

At block 306, the TA controller 120 receives a request to initiate a threat analysis VNF from the threat detection engine 115. For example, as described above and in relation to blocks 502, 504, and 508 in FIG. 5, the threat detection engine detects a threat or determines that a threat VNF should be initiated for the vSwitch 105 and generates a request to initiate a threat analysis VNF and transmits the request to the TA controller.

Upon receiving the request to initiate a threat analysis VNF, at block 308, the TA controller 120 determines if the vSwitch is able to host the threat analysis VNF. For example, the TA controller 120 determines whether the vSwitch 105 has computing resources/capacity to host a threat analysis VNF. Upon determining that the vSwitch is able to host the threat analysis VNF, method 300 proceeds to block 310 where the TA controller 120 initiates the threat analysis VNF 141 at the vSwitch 105.

Upon determining that the vSwitch is not able to host the threat analysis VNF, method 300 proceeds to block 312 where the TA controller 120 selects an alternate host for the threat analysis VNF. In some examples, selecting the alternate host includes identifying a proximate vSwitch or other hosting component that has resources to host the threat analysis VNF. For example, as shown in FIG. 2, the TA controller 120 selects the vSwitch 205*a* as the alternate host. At block 314 the TA controller 120 initiates the threat analysis VNF at the alternate host. For example, as also shown in FIG. 2, the TA controller 120 initiates the threat analysis VNF 241*a* on the vSwitch 205*a*. In both example threat analysis VNFs, the TA controller 120 initiates the threat analysis VNF with a set configuration including network performance parameters and network traffic handling procedure among other configurations.

Once the threat analysis VNF (e.g. the threat analysis VNF 141 or 241*a*, etc.) is established, method 300 continues to block 316 where the TA controller 120 updates the threat detection engine with a threat analysis VNF configuration. For example, the TA controller 120 updates the threat detection engine 115 with the configuration for the threat analysis VNF 141 to prevent a compromised threat-analysis VNF. Once the configuration is provided, the behavior pattern of the threat analysis VNF 141 is known to both the TA-controller 120 and the threat detection engine 115, and therefore any deviation from that behavior can be detected. For instance, if the threat analysis VNF 141 is configured to analyze traffic and send reports to the TA controller 120, any packet coming out of the threat-analysis VNF 141 going to somewhere other than the TA controller 120 will indicate threat-analysis VNF 141 is compromised. Ensuring that the threat-analysis VNF is not-compromised is done in parallel while the threat-analysis VNF 141 analyzes traffic for potential threats and communicates with the TA controller 120.

At block 318, the TA controller 120 redirects network traffic at the vSwitch to the threat analysis VNF. For example, the TA controller 120 causes the network traffic associated with the threat detected by the threat detection engine 115 to be routed via the threat analysis VNF 141. The TA controller 120 may cause the traffic to be routed via the threat analysis VNF 141 using the controller messages 160 and/or by instructing the threat detection engine 115 to route the traffic via the threat analysis VNF 141.

At block 320, the TA controller 120 receives a threat analysis report from the threat detection engine and/or threat analysis VNF 115. In some examples, the threat detection engine 115 observes the behavior of the network traffic and the threat analysis VNF 141 and generates a report based on the behavior. The threat analysis report may indicate that no threat has been detected based on the threat detection engine 115's analysis of the network traffic and threat analysis VNF 141 behavior. The threat analysis report may also indicate that a threat is detected on the vSwitch 105 (e.g. a VNF executing on the vSwitch is compromised.) The TA controller 120 updates the threat feed service 170 with the identified threat and prevents the threat from further harm to the network as described in relation to FIG. 4.

Figure 4:
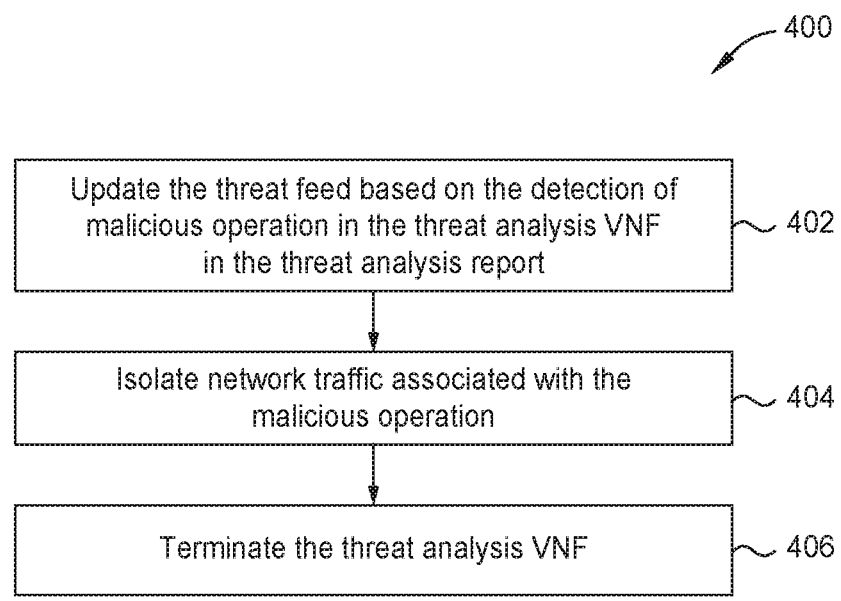

FIG. 4 illustrates a method for network threat detection at a threat aware controller, according to one embodiment. Method 400 begins at block 402 where the TA controller 120 updates a threat feed based on the detection of malicious operation in the threat analysis VNF 141 base on the threat analysis report. For example, when a threat has been detected by the threat detection engine 115 and included in the threat analysis report, the TA controller updates the threat feed service 170 and any other TA controllers in associated networks. This provides fast and up to date information to every network actor on the nature and emergences of the detected threats.

At block 404, the TA controller 120 isolates network traffic associated with the detected malicious operation. In some examples, the TA controller 120 isolates the network traffic associated with the detected malicious operation by terminating the associate VNF(s) that are associated with the threat traffic. In some examples, the TA controller 120 may not terminate the VNF, but instead cause the network traffic to be directed to specific network resources that isolate the network traffic and prevent network disruption and/or further spread of the threat.

At block 406, the TA controller 120 terminates the threat analysis VNF. Once a threat to the network is contained the TA controller 120 terminates the threat analysis VNF in order to conserve computing and network resource use. The vSwitch 105 and the threat detection engine 115 may also be informed of the terminated threat analysis VNF via control messages sent from the TA controller 120.

FIG. 5 illustrates a method for network threat detection at a threat detection engine on virtual network switch, according to one embodiment. In some examples, the threat detection engine 115 is initiated by the TA controller 120 as described in relation to block 302 in FIG. 3. Method 500 begins at block 502 where the threat detection engine 115 receives the threat feed 155 comprising a plurality of network threat properties from a TA controller 120. For example, the threat detection engine receives the threat feed 155 form the TA controller 120 as described in relation to block 304 of FIG. 3

At block 504, the threat detection engine 115 inspects network traffic associated with one or more virtual network functions (VNFs) on the vSwitch. In some examples, the threat detection engine 115 uses the plurality of network threat properties to detect any malicious operation in the vSwitch 105. For example, the threat detection engine 115 performs line rate signature matching on the traffic going in/out/through the VNFs of the vSwitch 105. In the presence of a signature associated with a known threat, the embedded threat detection engine 115 will drop the traffic and raise a security alert as described in relation to block 508.

In some examples, method 500 continues at block 506 where the threat detection engine 115 transmits telemetry data for network traffic to the TA controller 120. During the various threat detection operations, the threat detection engine 115 also transmits various network performance data such as the telemetry data for the network traffic. This data is used by the TA controller 120 to further configure the vSwitch 105 and update the service 170. The telemetry data may also be used to detect threats at the TA controller 120.

At block 508, the threat detection engine 115 detects a threat anomaly in the inspected network traffic using the threat properties. For example, the threat detection engine 115 using the network threat properties detects abnormal or identified behavior in the network traffic at the vSwitch 105. For example, the VNFs 131 and 132 may exhibit abnormal behavior detected by the threat detection engine 115 including unexpected performance and changes in the operational state of the VNF and the traffic transmitted to or from the VNFs 131 and 132. Other examples anomalies include a VNF generating traffic with signatures that match known malware, a VNF sending traffic to identified malicious destinations, a VNF suddenly increasing the rate of network traffic it generates, a VNF unexpectedly replicating same packets, etc.

At block 510, the threat detection engine 115 determines to further inspect the network traffic. The threat properties may include an indication of what behavior should be performed on the threat anomaly traffic including whether to inspect the traffic in further detail. For example, the threat properties may indicate that the traffic should be isolated and/or dropped from further transmission without further inspection. In some examples, the method 500 proceeds to block 512 and drops the network traffic associated with the threat anomaly.

In an example where the traffic is to be further inspected, method 500 proceeds to block 514 where the threat detection engine 115 transmits a request to initiate a threat analysis VNF to the threat aware controller. In some examples, the request to initiate a threat analysis VNF includes an identification of the detected threat anomaly and other information such as a source VNF etc. such that the TA controller 120 may track and respond to threats developing in the network.

At block 516, the threat detection engine 115 receives a threat analysis VNF configuration from the threat aware controller upon initiation of the threat analysis VNF. As described in relation to blocks 310-316, the TA controller 120 initiates the threat analysis VNF 141 upon receipt of the request to initiate a threat analysis VNF and sends a threat analysis VNF configuration to the threat detection engine 115. In some examples, the threat analysis VNF configuration also includes an identification of the location of the threat analysis VNF, such as established on the vSwitch 105 or the vSwitch 205a. The threat analysis VNF configuration also includes information related to the handling of the network traffic related to the threat detection engine and the expected behavior/configuration of the threat analysis VNF during operation.

In some examples, the threat detection engine 115 uses the threat analysis VNF configuration to detect if the threat analysis VNF is or becomes compromised as described in block 520. The threat detection engine 115 also verifies that the threat analysis VNF can receive any suspicious to-be-analyzed traffic without being flagged as malicious. In some examples, the threat-analysis VNF 141 generates a report and/or transmits various behavior metrics to send to the TA-aware controller based on various configurations and parameters in the threat analysis VNF configuration.

At block 518, the threat detection engine 115 isolates network traffic associated with the threat anomaly to the threat analysis VNF. For example, the threat detection engine 115 redirects the traffic from a misbehaving VNF or other network traffic to the threat analysis VNF 141. In an example where the threat analysis VNF is hosted on a different network component, such as the threat analysis VNF 241a, the threat detection engine 115 redirects the traffic from the vSwitch 105 to the vSwitch 205a and monitors the performance of the threat analysis VNF 241a. In some examples, only a subset of the traffic associated with the anomalous VNF is isolated or sent to the threat analysis VNF.

At block 520, the threat detection engine 115 monitors an operation of the threat analysis VNF based on the threat analysis VNF configuration. The configuration of the threat-analysis VNF and the monitoring of the threat-analysis VNF is used by the threat detection engine 115 to detect if the threat-analysis VNF 141 becomes compromised as well as ensuring the threat analysis VNF 141 may receive the suspicious to-be-analyzed traffic without being flagged as malicious. In some examples, the threat-analysis VNF 141 generates a report or metrics and transmits the report/metrics to the TA controller 120. In one example, the threat detection engine 115 detects an abnormal packet ratio on the traffic being monitored at the threat analysis VNF.

At block 522, the threat detection engine 115 determines, based on the monitored traffic at the threat analysis VNF and the threat analysis VNF configuration, if a malicious operation is detected at the threat analysis VNF. For example, the threat detection engine 115 uses the threat information and detects abnormalities in the monitored traffic at the threat analysis VNF 141 such as an abnormal packet ratio, etc. In the monitoring described in relation to block 520, the threat detection engine 115 determines that the abnormal packet ratio is a malicious operation.

When malicious operation is detected method 500 proceeds to block 524 and the threat detection engine 115 drops network traffic associated with the malicious operation at the threat analysis VNF. In an example where the threat detection engine 115 does not detect further malicious operation at the threat analysis VNF, the traffic and the threat analysis VNF is further monitored for a time, which may be set by the TA controller 120. For example, the threat detection engine 115 drops the traffic associated with the threat analysis VNF 141 and quarantines any other activity from the threat analysis VNF 141 at the vSwitch 105.

At block 526, the threat detection engine 115 generates a threat analysis report based on the monitored behavior of the threat analysis VNF 141 and the various monitored traffic. In some examples, the report includes an identification of malicious or abnormal operation detected at the threat analysis VNF 141 and the corrective actions taken by the threat detection engine 115 (e.g., dropping packets, isolating traffic etc.). In some examples, the threat analysis report indicates that no threat was detected and that the threat analysis VNF may be terminated.

At block 528, the threat detection engine 115 transmits the threat analysis report to the threat aware controller. In some examples, the transmission of the report to the TA controller 120 indicates that the threat analysis VNF may be terminated.

Figure 6:
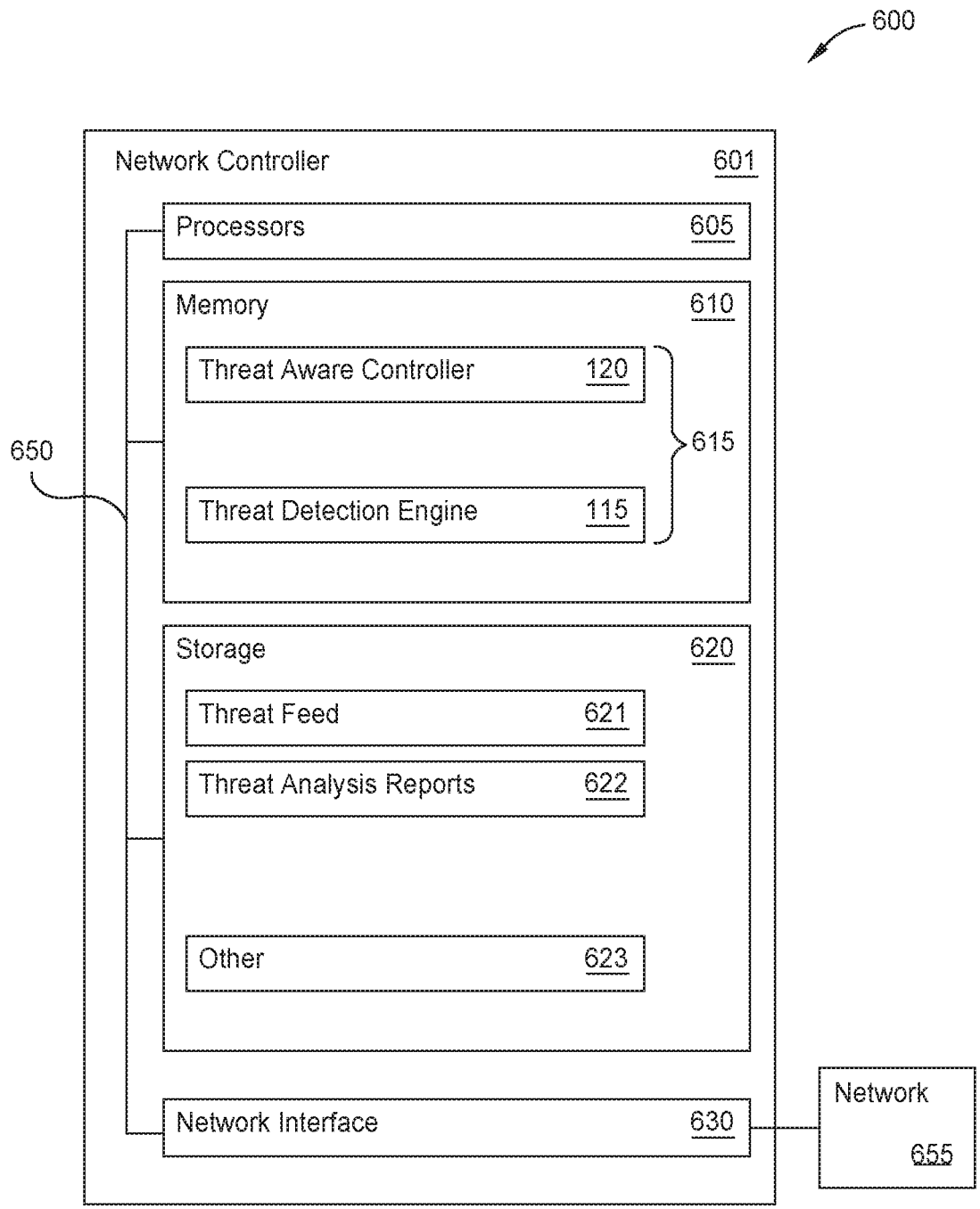
FIG. 6 is a block diagram of a server, according to one embodiment described herein.

Turning now to FIG. 6 which depicts a server 601, according to one embodiment described herein. An arrangement 600 may include server 601 configured to execute the various functions of the controllers described herein. The server 601 is shown in the form of a general-purpose computing device, but may include a server and/or application executing on a cloud network. The components of server 601 may include, but are not limited to, one or more processing units or processors, a system memory 610, a storage system 620, network interface 630 connecting the server 601 to network 655, and a bus 650 that couples various system components including the system memory 610 and storage system 620 to processors 605 along with various input/output components (not shown). In other embodiments, arrangement 600 is distributed and includes a plurality of discrete computing devices that are connected through wired or wireless networking.

Bus 650 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Server 601 typically includes a variety of computer system readable media. Such media may be any available media that is accessible by server 601, and it includes both volatile and non-volatile media, removable and non-removable media.

System memory 610 can include computer system readable media in the form of volatile memory, such as random access memory (RAM) and/or cache memory. Server 601 may further include other removable/non-removable, volatile/non-volatile computer system storage media. By way of example, storage system 620 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a Compact Disc Read-Only Memory (CD-ROM), digital versatile disc-read only memory (DVD-ROM) or other optical media can be provided. In such instances, each can be connected to bus 650 by one or more data media interfaces. As will be further depicted and described below, memory 610 may include at least one program product having a set (e.g., at least one) of program modules that are configured to carry out the functions of various embodiments described herein.

Server 601 may further include other removable/non-removable, volatile/non-volatile computer system storage media. In some examples storage system 620 may be included as part of memory 610 and may typically provide a non-volatile memory for the networked computing devices, and may include one or more different storage elements such as Flash memory, a hard disk drive, a solid state drive, an optical storage device, and/or a magnetic storage device. For example, storage system 620 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 350 by one or more data media interfaces. Storage 620 may include media for caching threat feed information 621, threat analysis reports 622, and other information 623 stored for access and use by the server 601.

Memory 610 may include a plurality of modules 615 for performing various functions described herein. The modules 615 generally include program code that is executable by one or more of the processors 605. As shown, modules 615 include the TA controller 120 and the threat detection engine 115. The modules 615 may also interact with each other and storage system 620 to perform certain functions as described herein.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or related data available in the cloud related to the TA controller 120 and the threat detection engine 115. Doing so allows a user to access this information from any computing system attached to a network connected to the cloud (e.g., the Internet).

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method for network threat detection at a threat aware controller comprising:
   initiating a threat detection engine in a virtual network switch (vSwitch);
   providing a threat feed to the threat detection engine;
   receiving a request to initiate a threat analysis virtual network function (VNF) from the threat detection engine, wherein the request to initiate a threat analysis VNF is transmitted from the threat detection engine upon detection of a threat anomaly; and
   initiating a threat analysis VNF;
   updating the threat detection engine with a threat analysis VNF configuration;
   redirecting network traffic at the vSwitch to the threat analysis VNF; and
   receiving a threat analysis report from the threat detection engine or the threat analysis VNF.

2. The method of claim 1,
   wherein the threat analysis report is generated at the threat detection engine or the threat analysis VNF based on a monitored traffic at the threat analysis VNF; and
   wherein the threat analysis report comprises a detection of malicious operation at the threat analysis VNF.

3. The method of claim 2, further comprising:
   updating the threat feed based on the detection of malicious operation in the threat analysis VNF in the threat analysis report;
   isolating network traffic associated with the detected malicious operation; and
   terminating, via the threat aware controller, the threat analysis VNF.

4. The method of claim 1, wherein the threat feed comprises one or more threat properties for network traffic, wherein the threat detection engine on the vSwitch uses the one or more threat properties to inspect network traffic and detect threat anomalies.

5. The method of claim 4, wherein providing the threat feed comprises:
   transmitting the threat feed to the threat detection engine via a control-plane function, wherein the control-plane function configures the threat detection engine with the one or more threat properties.

6. The method of claim 1, further comprising:
   receiving telemetry data for network traffic from the threat detection engine; and
   detecting, at the threat aware controller, a threat anomaly based on the telemetry data.

7. The method of claim 1, wherein initiating the threat analysis VNF further comprises:
   determining that the vSwitch cannot host the threat analysis VNF;
   selecting an alternate host for the threat analysis VNF; and
   initiating the threat analysis VNF at the alternate host.

8. A system, comprising:
   a processor; and
   a memory comprising instructions which, when executed on the processor, performs an operation, the operation comprising:
   initiating a threat detection engine in a virtual network switch (vSwitch);
   providing a threat feed to the threat detection engine;

receiving a request to initiate a threat analysis virtual network function (VNF) request from the threat detection engine, wherein the request to initiate a threat analysis VNF is transmitted from the threat detection engine upon detection of a threat anomaly;

initiating a threat analysis VNF;

updating the threat detection engine with a threat analysis VNF configuration;

redirecting network traffic at the vSwitch to the threat analysis VNF; and receiving a threat analysis report from the threat detection engine or the threat analysis VNF.

9. The system of claim 8, wherein the threat analysis report is generated at the threat detection engine or threat analysis VNF based on a monitored operation of the threat analysis VNF; and wherein the threat analysis report comprises a detection of malicious operation at the threat analysis VNF.

10. The system of claim 9, further comprising:

updating the threat feed based on the detection of malicious operation in the threat analysis VNF in the threat analysis report;

isolating network traffic associated with the detected malicious operation; and terminating the threat analysis VNF.

11. The system of claim 8, wherein the threat feed comprises one or more threat properties for network traffic, wherein the threat detection engine on the vSwitch uses the one or more threat properties to inspect network traffic and detect threat anomalies.

12. The system of claim 11, wherein providing the threat feed comprises:

transmitting the threat feed to the threat detection engine via a control-plane function, wherein the control-plane function configures the threat detection engine with the one or more threat properties.

13. The system of claim 8, wherein initiating the threat analysis VNF further comprises:

determining that the vSwitch cannot host the threat analysis VNF;

selecting an alternate host for the threat analysis VNF; and initiating the threat analysis VNF at the alternate host.

14. A method for network threat detection at a threat aware controller comprising:

initiating a threat detection engine in a virtual network switch (vSwitch);

providing a threat feed to the threat detection engine;

receiving a request to initiate a threat analysis virtual network function (VNF) from the threat detection engine, wherein the request to initiate a threat analysis VNF is transmitted from the threat detection engine upon detection of a threat anomaly; and initiating a threat analysis VNF by:

determining that the vSwitch cannot host the threat analysis VNF;

selecting an alternate host for the threat analysis VNF; and initiating the threat analysis VNF at the alternate host.

15. The method of claim 14, further comprising:

updating the threat detection engine with a threat analysis VNF configuration;

redirecting network traffic at the vSwitch to the threat analysis VNF;

receiving a threat analysis report from the threat detection engine or the threat analysis VNF;

wherein the threat analysis report is generated at the threat detection engine or the threat analysis VNF based on a monitored traffic at the threat analysis VNF; and wherein the threat analysis report comprises a detection of malicious operation at the threat analysis VNF.

16. The method of claim 15, further comprising:

updating the threat feed based on the detection of malicious operation in the threat analysis VNF in the threat analysis report;

isolating network traffic associated with the detected malicious operation; and terminating, via the threat aware controller, the threat analysis VNF.

17. The method of claim 14, wherein the threat feed comprises one or more threat properties for network traffic, wherein the threat detection engine on the vSwitch uses the one or more threat properties to inspect network traffic and detect threat anomalies.

18. The method of claim 17, wherein providing the threat feed comprises:

transmitting the threat feed to the threat detection engine via a control-plane function, wherein the control-plane function configures the threat detection engine with the one or more threat properties.

19. The method of claim 14, further comprising:

receiving telemetry data for network traffic from the threat detection engine; and detecting, at the threat aware controller, a threat anomaly based on the telemetry data.

* * * * *